United States Patent
Uda

(10) Patent No.: US 7,443,876 B2
(45) Date of Patent: Oct. 28, 2008

(54) INFORMATION PROCESSING TERMINAL, TRANSMISSION PRIVILEGE ROUNDING SYSTEM, TRANSMISSION PRIVILEGE ROUNDING METHOD AND TRANSMISSION PRIVILEGE ACQUIRING PROGRAM

(75) Inventor: Makoto Uda, Shizuoka (JP)

(73) Assignee: Yazaki Corporation, Tokyo (JP)

(*) Notice: Subject to any disclaimer, the term of this patent is extended or adjusted under 35 U.S.C. 154(b) by 748 days.

(21) Appl. No.: 10/708,496

(22) Filed: Mar. 8, 2004

(65) Prior Publication Data

US 2004/0208203 A1 Oct. 21, 2004

(30) Foreign Application Priority Data

Apr. 16, 2003 (JP) .............................. 2003-111272

(51) Int. Cl.
  *H04L 12/413* (2006.01)
  *H04L 12/42* (2006.01)
  *H04L 12/403* (2006.01)
(52) U.S. Cl. ...................... 370/447; 370/450; 370/459
(58) Field of Classification Search ......... 370/447–453, 370/456, 457, 465, 419–421, 445, 461, 462
See application file for complete search history.

(56) References Cited

U.S. PATENT DOCUMENTS 5,479,613 A * 12/1995 Geyer et al. ................. 709/224
5,684,956 A * 11/1997 Billings ...................... 709/219

FOREIGN PATENT DOCUMENTS

JP 11-234310 8/1999

\* cited by examiner

*Primary Examiner*—Seema S. Rao
*Assistant Examiner*—Mon Cheri S Davenport
(74) *Attorney, Agent, or Firm*—Kratz, Quintos & Hanson, LLP

(57) ABSTRACT

A plurality of information processing terminals 100 to 130 are connected to a network. Each processing terminal parameter-manages the total of the idle time units obtained through the detection of the idle time on the network. The processing terminal acquires a transmission privilege when the parameter and its own node ID agree with each other, and sends out the transmission frame inclusive of its own node ID to the network. The reception means 105 receives, from the network, the transmission frame transmitted from the other information processing terminals. The control means 103 extracts the node ID included in the transmission frame thus received and updates the parameter to the node thus extracted, and adjusts the synchronization of the parameters commonly possessed on the same network. In accordance with such a configuration, the transmission privilege can be rounded without exchanging a token frame between specified nodes.

6 Claims, 4 Drawing Sheets

US 7,443,876 B2

INFORMATION PROCESSING TERMINAL, TRANSMISSION PRIVILEGE ROUNDING SYSTEM, TRANSMISSION PRIVILEGE ROUNDING METHOD AND TRANSMISSION PRIVILEGE ACQUIRING PROGRAM

BACKGROUND OF THE INVENTION

1. Field of the Invention

This invention relates to an information processing terminal, a transmission privilege rounding system, a transmission privilege rounding method and transmission privilege acquisition rounding method for rounding a transmission privilege for a plurality of nodes on the same network.

2. Description of the Related Art

The communication control system which is used for a bus type LAN or ring type LAN includes a token passing system. The token passing system is to round a token unidirectionally on a transfer path so that a transmission privilege is sequentially delivered with no collision of data. The delivery of the transmission privilege is carried out using a dedicated token frame.

JP-A-11-234310 discloses a method of designating a delivery destination by adding a token into a transmission data frame. Specifically, the station which has acquired the token determines whether or not there is a data to be transmitted (step S30). If there is the data to be transmitted (Y in step S30), the station makes the processing of the user data containing the token (step S31). If there is not the data to be transmitted (N in step S30), the station makes the transmission processing of a token frame.

In the technique described in the above reference, if there is the user data to be transmitted, the station having acquired the token transmits the token contained in the user data. For this reason, it is not necessary to transmit the token frame separately. However, even when there is no data to be transmitted, the station must transmit the token frame. Further, where the station which is to receive the token disappears owing to failure, the token also disappears. In order to continue the communication thereafter, the processing for regenerating the token is required. Moreover, where a new station is to be added, the existing stations must be modified so that the token can be passed to the new station.

This invention has been accomplished in view of the problems described above.

An object of this invention is to provide an information processing terminal, a transmission privilege rounding system, a transmission privilege rounding method and transmission privilege acquisition rounding program which do not produce frame collision when a transmission privilege is rounded without the exchange of the token frame between prescribed nodes.

Another object of this invention is to provide an information processing terminal, a transmission privilege rounding system, a transmission privilege rounding method and transmission privilege acquisition rounding program in which an increase or decrease in the number of nodes on the same network does not affect existing nodes and the processing of rounding a transmission privilege to provide high reliability and expandibility.

SUMMARY OF THE INVENTION

In order to attain the above object, in accordance with this invention, there is provided an information processing terminal 100 which is connected onto a network to which a plurality of information processing terminals 100 to 130 are connected, and transmits a signal when it acquires a transmission privilege on the network, comprising:

a bus status detecting means 106 for detecting whether the network is busy or idle;

a counting means 101 for repeating count-up to reach a idle time unit if the network is idle as a detected result of the bus status detecting means;

a control means 103 for managing a parameter incremented whenever the idle time unit is detected as a result of count-up by the counting means and creating a transmission frame when the parameter agrees with its own node ID having a default node ID0 allotted to each node as an initial value; and a transmitting means 104 for transmitting the transmission frame created by the control means.

In this configuration, the information processing terminal 100 connected to the network parameter-manages the total of the idle time unit(s) obtained through detection of the idle time on the network, acquires a transmission privilege when the parameter agree with the node ID of each terminal and transmits a transmission frame onto the network. In this way, each information processing terminal can acquire a transmission privilege with no exchange of the token frame between specific terminals on the same network, thereby avoiding frame collision.

Preferably, the information processing terminal further includes a receiving means 105 for receiving the transmission frame. The transmission frame transmitted from the other information processing terminal connected to the network includes the default node ID0. The control means extracts the default node ID0 included in the transmission frame received by the receiving means 105 and updates the parameter to the default node ID0.

In this configuration, the control means 103 extracts the default node ID0 of a transmission destination equal to the parameter thereof and updates the parameter to the default node ID0. In this way, synchronization adjustment of the parameter possessed on the same network can be done to improve reliability. In addition, the terminal newly added and the terminal restored from failure can automatically possess the parameter and easily connected to the network.

Preferably, the information processing terminal includes a synchronizing error detecting means for detecting within its own terminal an error which affects the synchronization with the other information processing terminal on the network and relates to counting of the parameter. When the error is detected by the synchronizing error detecting means, the control means sets its new own node ID at the sum of a prescribed value enough to continue the period dedicated to reception for a prescribed time and the default node ID0, and thereafter when the transmission frame is normally received by the receiving means, the control means updates the parameter to the default node ID0 included in the transmission frame.

In accordance with this configuration, in each terminal, when an error occurs which affects the synchronization with the other information processing terminal 110 to 130 on the network and relates to counting of the parameter, the control means updates its own node ID to the sum of the default node ID and the maximum number n of connectable nodes, thereby spontaneously stopping the acquisition of transmission privilege. In this way, the information processing terminal 100 in which the error has been detected can leave quickly from the network so that the transmission privilege rounding processing by other information processing terminals 110 to 130 is not affected. If the transmission frame is normally received, the parameter can be returned to the default node so that the left information processing terminal 100 is can be returned to the network.

In accordance with this invention, there is provided a transmission privilege rounding system wherein a plurality of information processing terminals one of which is defined by one of the above information processing terminals are connected to the same network, and the transmission privilege is rounded among the plurality of information processing terminals.

In this configuration, the transmission privilege commonly having the parameter is rounded among the plurality of information processing terminals connected to the network. In this way, the transmission privilege can be delivered with no exchange of the token frame between specific terminals on the same network. If addition/leaving of the terminal occurs on the same network, the rounding processing of the transmission privileged can be continued, and setting of the existing terminals is not required to be changed.

In accordance with this invention, there is provided a method for rounding a transmission privilege on a network to which a plurality of nodes 100 are connected, comprising the steps to be carried out by each of the nodes of:

detecting whether the network is busy or idle, repeating count-up to reach a idle time unit if the network is idle, and incrementing a parameter whenever the idle time is detected;

transmitting the transmission frame inclusive of the node ID if the parameter agree with the node ID;

extracting the node ID included in the transmission frame when the transmission frame is received from the network and updating the parameter to the node ID.

In this configuration, the information processing terminal 100 connected to the network parameter-manages the total of the idle time units obtained through detection of the idle time on the network, acquires a transmission privilege when the parameter agree with the node ID of each terminal and transmits a transmission frame onto the network. In this way, each information processing terminal can acquire a transmission privilege with no exchange of the token frame between specific terminals on the same network. If addition/leaving of the terminal occurs on the same network, the rounding processing of the transmission privileged can be continued, and setting of the existing terminals is not required to be changed.

In accordance with this invention, there is provided a computer-readable transmission privilege acquisition program loaded in a node which can transmit a signal onto a network to which a plurality of nodes are connected when each node acquires a transmission privilege, the program causing a computer to execute:

processing of detecting whether the network is busy or idle;

processing of repeatedly counting to reach a idle time unit if the network is idle;

processing of incrementing a parameter whenever the idle time is detected, thereby creating a transmission frame inclusive of the node ID if the parameter agree with the node ID; and processing of transmitting the transmission frame thus created.

In this configuration, the transmission privilege acquisition program loaded in each of a plurality of nodes connected to the network parameter-manages the total of the idle time units obtained through detection of the idle time on the network, acquires a transmission privilege when the parameter agree with the node ID of each terminal and transmits a transmission frame onto the network. In this way, each information processing terminal can acquire a transmission privilege with no exchange of the token frame between specific terminals on the same network, thereby avoiding frame collision.

The above and other objects and features of the invention will be more apparent from the following description taken in conjunction with the accompanying drawings.

DESCRIPTION OF THE PREFERRED EMBODIMENTS

Figure 1:
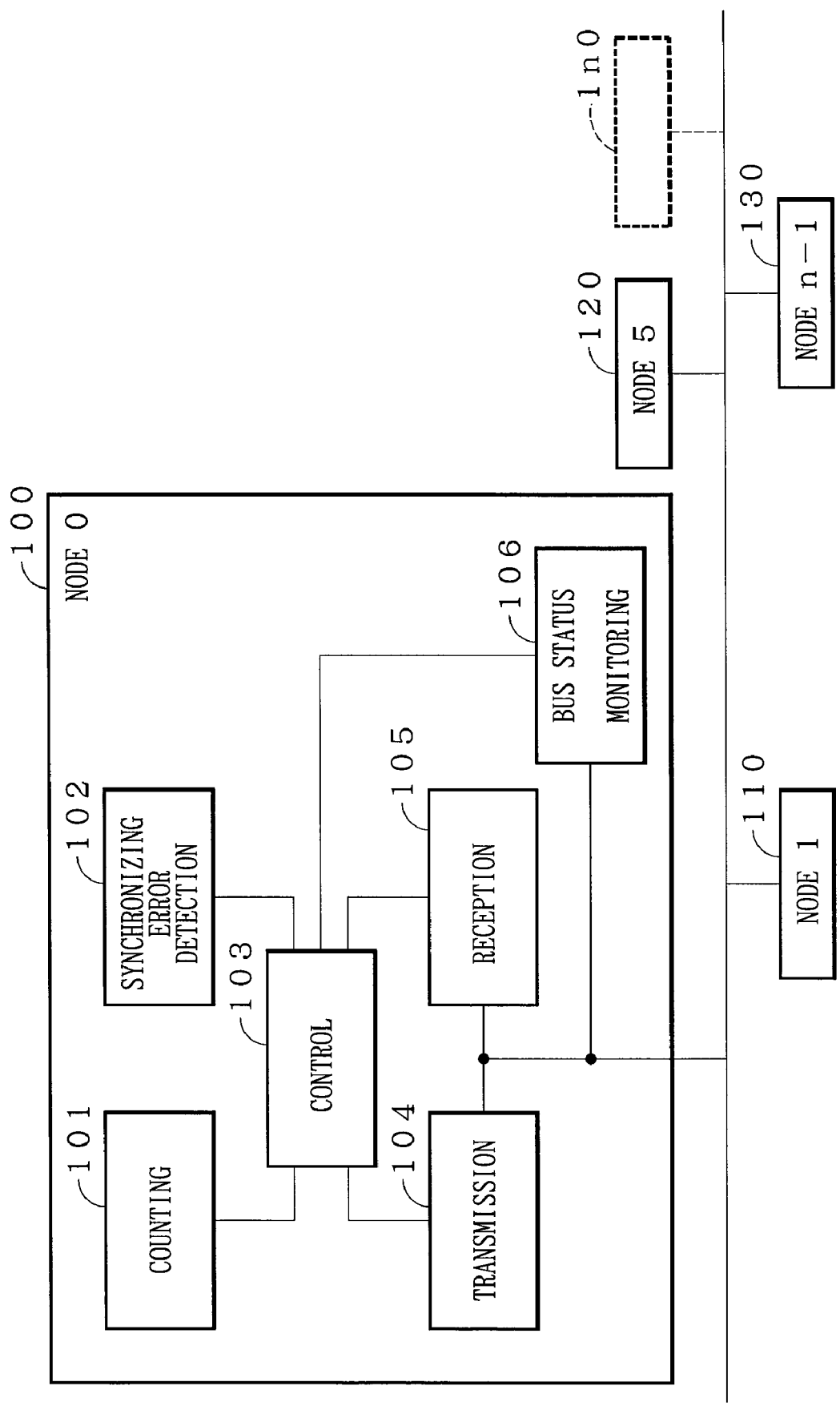
FIG. 1 is a block diagram showing the configuration of a transmission privilege rounding system according to an embodiment of this invention.

Referring to the drawings, a detailed explanation will be given of an embodiment of this invention.

FIG. 1 is a block diagram showing the configuration of a transmission privilege rounding system according to an embodiment of this invention. As seen from FIG. 1, a transmission privilege rounding system includes four nodes 100 to 130 connected to the same bus. Any number of nodes can be connected to the bus. Namely, the number of nodes can be increased or decreased as long as it is within a prescribed permissible number (the maximum number of nodes is defined by n).

The node 100 is a device which can be connected to the network and is addressable. The node 100 includes a counting means 101, a synchronizing error detecting means 102, a control means 103, a transmitting means 104, a receiving means 105 and a bus status monitoring means 106. The counting means 101 serves to repeat count-up to reach an idle time unit t using an idle timer tim as a parameter to measure the idle time between adjacent frames. Whenever the counting means 101 detects the idle time unit t, it informs the control means 103 of this fact. The synchronizing error detecting means 102 detects whether or not an error, e.g. failure of the counting means 101, which can affect the synchronization with other nodes 110 to 130 on the bus, has occurred in its own node. If it detects the error, it informs the control means 103 of this fact.

The control means 103 includes a CPU, ROM and RAM (not shown). The CPU serves to control the entire device using the work area in the RAM according to the program stored in the ROM. The idle counter value Cnt and node ID, which are parameters employed in this embodiment, are managed by the register within the CPU. The CPU creates a transmission frame when the data is transmitted.

The transmitting means 104 transmits the transmission frame thus created onto the bus. The receiving means 105 monitors the bus and receive the transmission frame (if it exists) to deliver it to the control means 103. The bus status monitoring means 106 monitors the bus status in a physical layer level. The bus status monitoring means 106 informs the control means 103 of the bus status (busy or idle).

Figure 2:
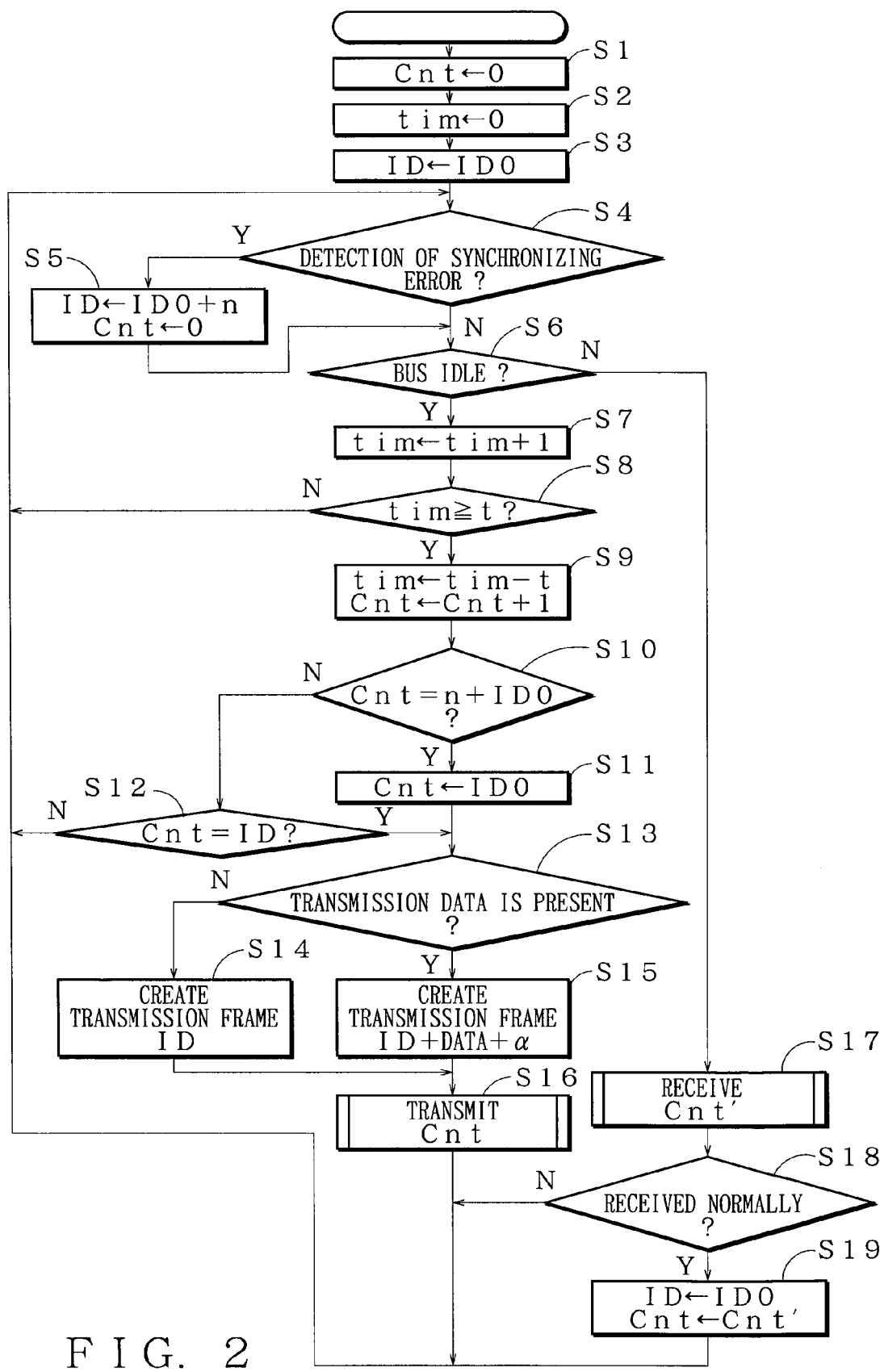
FIG. 2 is a flowchart for explaining the operation of a transmission privilege rounding system according to an embodiment of this invention.

FIG. 2 is a is a flowchart for explaining the operation of a transmission privilege rounding system according to an embodiment of this invention. First, The nodes 100 to 130 each make settings of the respective initial values of various registers. Specifically, the control means 103 to 133 (only the control means 103 is illustrated in FIG. 2) set the idle counter value Cnt, which is a parameter, at 0 (zero) (step S1). Now it is assumed that the counting number of the idle counter value Cnt in which the transmission privilege tours the network agrees to the maximum number n of nodes. Next, the idle timer tim serving as a count register is set at 0 (zero) (step S2). The respective control means 103 to 133 in the nodes 100 to 130 set the node ID serving as the parameter at the default value ID0 peculiar to the individual node (step S3). Assuming that the maximum number of nodes is n, the allotted values of the ID0 are 0 ⌐(n−1).

The synchronizing error detecting means 102 to 132 (only the synchronizing error detecting means 102 is illustrated) of the nodes 100 to 130 detects whether an error affectable the synchronization with other nodes on the bus has occurred in its own device (step S4). If the synchronizing error detecting means 102 to 132 each detects that the synchronizing error has occurred (Y in step S4), the control means of the pertinent node sets the node ID at the sum of the default ID0 and the maximum node number n and sets the idle counter value Cnt at 0 (zero) (step S5). The pertinent node does not acquire the transmitting privilege until the idle counter value reaches ID0+n. The value to be set in the node ID is not limited to ID0+n. In order to enhance reliability, a value larger than n may be added. As long as it does not overlap the default ID0 of the other node, the value not larger than n may be added.

If the above error is not detected in step S4 (N in step S4), the bus status monitoring means 106 to 136 (only bus status monitoring means 106 is illustrated) of the nodes 100 to 130 detect whether or not the bus is idle (step S6). In this case, even if there are inconsistencies among the idle counter values Cnt of the nodes 100 to 130, the frame transmission processing is not performed in the other state than the idle status. This avoids the collision between the frames. If the bus is in the idle status (Y in step S6), the counting means 101 to 131 (only the counting means 101 is illustrated) of the nodes 100 to 130 increment the idle timer tim in order to measure the idle time between the frame (step S7).

The control means 103 to 133 of the nodes 100 to 130 determine whether or not the idle timer tim has been counted up to the value not smaller than the idle time unit t (step S8). If the idle timer tim does not reach the idle time unit t (N in step S8), the operation process returns to step S4. If the idle time tim has reached the idle time unit t (Y in step S8), the control means 103 to 133 of the nodes 100 to 130 subtract the idle time unit t from the idle timer tim to return the idle timer tim to the initial value (0) and increments the idle counter value Cnt (step S9).

The control means 103 to 133 of the nodes 100 to 130 determine whether or not the idle counter value Cnt is equal to the sum of the maximum node number n and the value of the default node ID0 (step S10). If not equal (N in step S10), the control means 103 to 133 determine whether or not the idle counter value Cnt is equal to the node ID (step S12). If not equal (N in step S12), the operation process returns to step S4. If equal (Y in step S12), it means that the pertinent node has acquired the transmission privilege. In this case, the control means determines whether or not there is the data to be transmitted (step S13).

In step S10, if the idle counter value Cnt is equal to the sum of the maximum node number n and the value of the default node ID0, the control means 103 to 133 of the node 100, which has acquired the transmission privilege through the second rounding of the transmission privilege (step S11), sets the idle counter Cnt at its own default node ID0.

In step S13, if there is not data to be transmitted (N in step S13), the control means of the node having the transmission privilege creates the transmission frame with the idle counter value Cnt (=ID0) to deliver it to the transmission means of the pertinent node. If there is the data to be transmitted (Y in step S13), the control means having the transmission privilege creates the transmission frame supplemented with the idle counter value Cnt (=ID0), transmission data, transmission destination address, rounding redundant code α, etc. (step S15) and delivers the transmission frame thus created to the transmitting means. The transmitting means sends out the transmission frame onto the bus (step S16). The operation process returns to step S4.

In step S6, if the bus status monitoring means 106 in the nodes 100 to 130 determines that the bus is in a busy status (N in step S6), the reception means 105 to 135 of the nodes 100 to 130 receives the above transmission frame from the bus and delivers it to the control means 103 to 133 (step S17).

The control means 103 to 133 determines whether or not the reception of the transmission frame was normal (step S18). If the reception was not normal (N in step S18), the operation process returns to step S4 without updating various parameters. If the reception was normal (Y in step S18), the control means 103 to 133 set the node ID at the node default ID0 of the nodes 100 to 130. The control means 103 to 133 update the idle counter value Cnt to the received idle counter value Cnt' (step S19). Thus, the idle counter values Cnt of the nodes 100 to 130 on the bus can be made equal. This does not require a specific node for creating a reference timing, and avoids system-down due to failure of the specific node. Also, in the node which is detecting a synchronizing error, the normal reception holds. After the node ID and idle counter value Cnt have been updated, the node returns to a transmissible status. The node which has acquired the privilege through the transmission privilege can transmit the transmission data.

Where the transmission frame includes the transmission data, the control means of the node which is a destination of the pertinent transmission data stores the storage portion (not shown). The control means of each of other nodes destroys the transmission data. The operation process returns to step S4.

Figure 3:
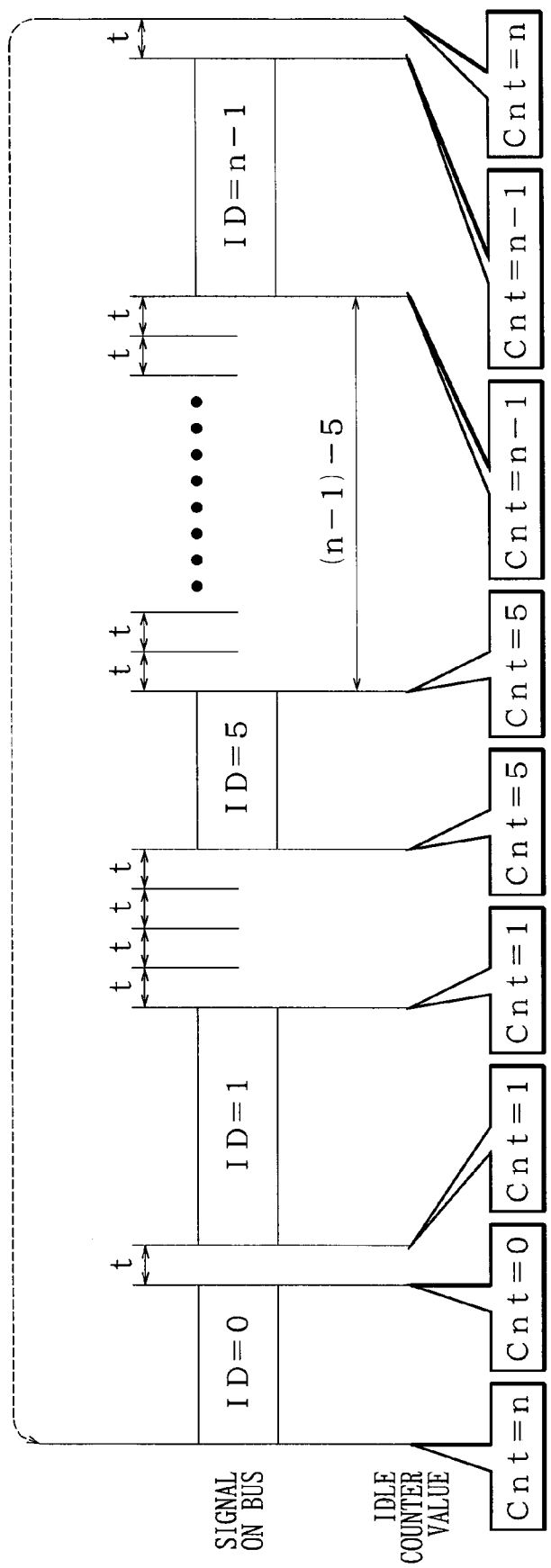
FIG. 3 is a view of an embodiment of the privilege rounding system according to an embodiment of this invention.
Figure 4:
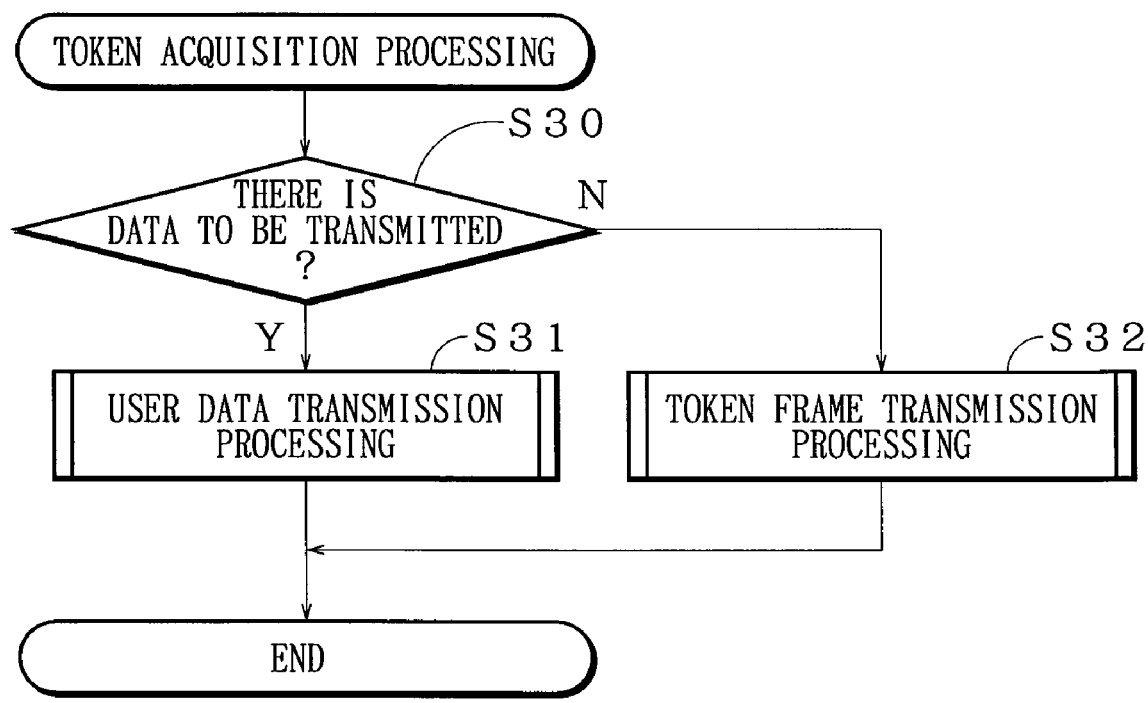
FIG. 4 is a flowchart showing the processing performed by the station (node) which has acquired the token according to an prior art.

An explanation will be given of an concrete example of the operation of a transmission privilege rounding system (transmission privilege rounding method) according to an embodiment of this invention. FIG. 3 is a view for explaining an example of the transmission privilege rounding system according to an embodiment of this invention. In the example shown in FIG. 3, the maximum number of nodes connectable to the bus is n, and the number of nodes connected actually is 4. The default node ID0s of the connected four nodes 0, 1, 5 and n−1 are 0, 1, 5 and n−1.

First, node 0, in which its own default ID0 of 0 is equal to the initial value of the idle counter value Cnt, sends out the transmission frame including 0 onto the bus. Node 1, node 5 and node n−1 receive the transmission frame thus sent and reset their idle counter value Cnt to 0. Thereafter, when an idle time unit t elapses, node 1, in which its own default ID0 is 1 and the idle counter value Cnt is 1, sends out the transmission frame containing 1 onto the bus. Then, node 0, node 5 and node n−1 receive the transmission frame thus sent and reset their idle counter value Cnt to 1. Thereafter, when four idle time units t elapse, node 5, in which its own default node ID0 is 5 and the idle counter value Cnt is 5, sends out the transmission frame containing 5 onto the bus.

Then, node 0, node 1 and node n−1 receive the transmission frame thus sent and reset their idle counter value Cnt to 5.

Thereafter, when a (n−1)−5 idle time units t elapses, node n−1, in which its own default ID0 is n−1 and the idle counter value Cnt is n−1, sends out the transmission frame containing n−1 onto the bus. Then, node 0, node 1 and 5 receive the transmission frame thus sent and reset their idle counter value Cnt to n−1. Thereafter, after idle time unit t elapses, node 0, in which its idle counter value Cnt is n and equal to the sum of 0 which is its own defalt ID0 and n, sends out the transmission frame containing 0 onto the bus.

Where each node has the transmission data, it transmits it so as to be included in the transmission frame. In this way, each node commonly posses the sum of idle time units between the frames, and acquires the transmission privilege when the sum is equal to its own default ID0. Through such a method, the transmission privilege is rounded.

This invention can be realized in such a manner that the program is executed by a computer. The program can be stored in a magnetic recording medium, an optical recording medium, an opto-magnetic recording medium, or a semiconductor IC recording medium. Further, the program can be downloaded by the protocol such as FTP (File Transfer Protocol), HTTP (hypertext transfer protocol), etc. through a network from a program server.

The embodiment as described above is only an example of preferred embodiments of this invention. This invention is not limited to the embodiment, but can be realized in various modifications without departing from the scope of this invention. For example, in the embodiment as described, this invention was explained for a bus-type LAN, but can be applied to a ring-type LAN.

The invention claimed is:

1. An information processing terminal which is connected onto a network to which a plurality of additional information processing terminals are connected, and transmits a signal when it acquires a transmission privilege on the network, comprising:
   a bus status detecting means for detecting whether said network is busy or idle;
   a counting means for repeating count-up to reach an idle time unit if the network is idle as a detected result of said bus status detecting means;
   a control means for setting a node ID of said information processing terminal to be equal to a default node ID0, for managing a parameter incremented whenever the idle time unit is detected as a result of count-up by said counting means, for creating a transmission frame with said node ID and without transmission data when transmission data is not present and said parameter is equal to said node ID of said information processing terminal, and for creating a transmission frame with said node ID and with transmission data when transmission data is present and said parameter is equal to said node ID of said information processing terminal; and
   a transmitting means for transmitting the transmission frame created by said control means.

2. An information processing terminal according to claim 1, further comprising a receiving means for receiving the transmission frame,
   wherein said transmission frame transmitted from one of said additional information processing terminals connected to said network includes the default node ID0, and
   said control means extracts the default node ID0 included in the transmission frame received by said receiving means and updates said parameter to said default node ID0.

3. An information processing terminal according to claim 2, further comprising a synchronizing error detecting means for detecting within its own terminal an error which affects the synchronization with said one of said additional information processing terminals on said network and relates to counting of said parameter,
   wherein when the error is detected by said synchronizing error detecting means, said control means sets said node ID of said information processing terminal to be equal to a sum of said default node ID0 and a maximum node number n, and thereafter when said transmission frame is normally received by said receiving means, said control means updates said parameter to said default node ID0 included in said transmission frame.

4. An information processing terminal according to one of claims 1 to 3, having a transmission privilege providing system wherein a transmission privilege is provided to each of said information processing terminal and said plurality of additional information processing terminals one at a time.

5. A method for providing a transmission privilege to each of a plurality of nodes one at a time, said plurality of nodes being connected on a network, comprising the steps to be carried out by each of said nodes of:
   detecting whether said network is busy or idle,
   repeating count-up to reach an idle time unit if said network is idle,
   incrementing a parameter whenever said idle time is detected;
   transmitting a transmission frame inclusive of the node ID and transmission data when transmission data is present and said parameter agrees with the node ID; and
   transmitting a transmission frame with the node ID and without transmission data when transmission data is not present and said parameter agrees with the node ID; and
   extracting said node ID included in said transmission frame when said transmission frame is received from the network and updating said parameter to said node ID.

6. A computer-readable transmission privilege acquisition program loaded in a node which can transmit a signal onto a network to which a plurality of nodes are connected when each node acquires a transmission privilege, said program causing a computer to execute:
   processing of detecting whether said network is busy or idle;
   processing of repeatedly counting to reach an idle time unit if said network is idle;
   processing of incrementing a parameter whenever said idle time is detected, thereby creating a transmission frame inclusive of the node ID and transmission data when transmission data is present and said parameter agrees with the node ID, and creating a transmission frame with the node ID and without transmission data when transmission data is not present and said parameter agrees with the node ID; and
   processing of transmitting the transmission frame thus created.

* * * * *